(12) United States Patent (10) Patent No.: US 12,699,386 B2
Piana et al. (45) Date of Patent: Aug. 4, 2026

(54) CONTAINER TREATMENT MACHINE AND METHOD FOR MONITORING THE OPERATION OF A CONTAINER TREATMENT MACHINE

(71) Applicant: KRONES AG, Neutraubling (DE)

(72) Inventors: Stefan Piana, Koefering (DE); Herbert Kolb, Hausen (DE); Alexander Hewicker, Woerth an der Donau (DE); Anton Niedermeier, Offenstetten (DE)

(73) Assignee: KRONES AKTIENGESELLSCHAFT, Neutraubling (DE)

( * ) Notice: Subject to any disclaimer, the term of this patent is extended or adjusted under 35 U.S.C. 154(b) by 70 days.

(21) Appl. No.: 17/997,350

(22) PCT Filed: Apr. 23, 2021

(86) PCT No.: PCT/EP2021/060621
§ 371 (c)(1),
(2) Date: Oct. 27, 2022

(87) PCT Pub. No.: WO2021/219499
PCT Pub. Date: Nov. 4, 2021

(65) Prior Publication Data
US 2023/0266752 A1 Aug. 24, 2023

(30) Foreign Application Priority Data
Apr. 29, 2020 (DE) .................... 10 2020 111 674.8

(51) Int. Cl.
*G05B 23/02* (2006.01)
(52) U.S. Cl.
CPC ....... *G05B 23/024* (2013.01); *G05B 23/0283* (2013.01)

(58) Field of Classification Search
CPC .............. G05B 23/024; G05B 23/0283; G05B 2219/45048; G05B 13/027;
(Continued)

(56) References Cited

U.S. PATENT DOCUMENTS 5,121,467 A * 6/1992 Skeirik ................ G05B 13/029
706/23
5,718,852 A * 2/1998 Campbell ............... B29C 49/04
264/541
(Continued)

FOREIGN PATENT DOCUMENTS

CN 105378571 A 3/2016
CN 108603817 A 9/2018
(Continued)

OTHER PUBLICATIONS

Yan, T. et al., "Online Detection of Glass Bottle Crack Based on Evolutionary Neural Network and Computer Vision," Proceedings of the 2012 2nd International Conference on Consumer Electronics, Communications and Networks (CECNet), Apr. 21, 2012, Yichang, China, 4 pages.
(Continued)

*Primary Examiner* — Mohammad K Islam
(74) *Attorney, Agent, or Firm* — McCoy Russell LLP

(57) ABSTRACT
The invention relates to a container treatment machine for treating containers, in particular in the beverage-processing industry, medical technology, or the cosmetics industry, the container treatment machine comprising a control unit for controlling the function of the container treatment machine and at least one treatment unit for treating the containers; the container treatment machine is designed to treat the containers in exactly one way; the container treatment machine comprises at least one component which can output data relating to its operating state and/or the operating state of the container treatment machine to the control unit; and the
(Continued)

control unit comprises a neural network which is configured and trained to use the data to determine whether a deviation of the operating state of the container treatment machine from a normal state is present and/or imminent.

18 Claims, 2 Drawing Sheets

(58) Field of Classification Search
CPC .... G05B 2219/34477; G05B 19/41875; G05B 13/048; G05B 23/0254; B65B 57/00; Y02P 90/02; B67C 3/007
See application file for complete search history.

(56) References Cited

U.S. PATENT DOCUMENTS

| | | | | |
|---|---|---|---|---|
| 2002/0001535 A1* | 1/2002 | Weng | A23B 2/25 | |
| | | | 422/26 | |
| 2006/0224540 A1 | 10/2006 | Shioiri et al. | | |
| 2007/0067678 A1* | 3/2007 | Hosek | G07C 3/00 | |
| | | | 714/25 | |
| 2009/0226032 A1* | 9/2009 | Merzbacher | G01V 5/20 | |
| | | | 382/103 | |
| 2014/0298100 A1* | 10/2014 | Grimm | B65C 9/40 | |
| | | | 714/37 | |
| 2017/0031329 A1* | 2/2017 | Inagaki | B25J 9/1674 | |

| | | | | |
|---|---|---|---|---|
| 2018/0278197 A1* | 9/2018 | Kubo | | G06N 3/084 |
| 2019/0384273 A1* | 12/2019 | Han | | G06N 3/09 |
| 2020/0348660 A1* | 11/2020 | Lee | | G06F 18/2413 |
| 2021/0148034 A1* | 5/2021 | Park | | H04N 23/57 |

FOREIGN PATENT DOCUMENTS

| | | | |
|---|---|---|---|
| DE | 4447288 | A1 | 7/1995 |
| DE | 102011017448 | A1 | 10/2012 |
| DE | 102018006024 | A1 | 2/2019 |
| EP | 0950608 | A1 | 10/1999 |
| EP | 3462260 | A1 | 4/2019 |
| WO | 2018192894 | A1 | 10/2018 |
| WO | 2018192894 | A9 | 10/2018 |

OTHER PUBLICATIONS

ISA European Patent Office, International Search Report Issued in Application No. PCT/EP2021/060621, Jul. 9, 2021, WIPO, 5 pages.
China National Intellectual Property Administration, Office Action and Search Report Issued in Application No. 202180031274.5, Nov. 30, 2024, 19 pages. (Submitted with Partial Translation).
Mushiri, T. et al., "Design of a Fuzzy Logic control system for monitoring gearbox jamming in a bottle washer machine," Proceedings of the 2015 International Conference on Industrial Engineering and Operations Management (IEOM), Mar. 3, 2015, Dubai, United Arab Emirates, 9 pages.

* cited by examiner

CONTAINER TREATMENT MACHINE AND METHOD FOR MONITORING THE OPERATION OF A CONTAINER TREATMENT MACHINE

CROSS REFERENCE TO RELATED APPLICATIONS

The present application is a U.S. National Phase of International Application No. PCT/EP2021/060621 entitled "CONTAINER TREATMENT MACHINE AND METHOD FOR MONITORING THE OPERATION OF A CON-TAINER TREATMENT MACHINE," and filed on Apr. 23, 2021. International Application No. PCT/EP2021/060621 claims priority to German Patent Application No. 10 2020 111 674.8 filed on Apr. 29, 2020. The entire contents of each of the above-listed applications are hereby incorporated by reference for all purposes.

TECHNICAL FIELD

The present invention relates to a container treatment machine and to a method for monitoring the operation of a container treatment machine.

BACKGROUND AND SUMMARY

Container treatment machines for treating containers are sufficiently known from the prior art. In particular, it is known to "interlock" container treatment machines of different types (e.g. blow molding machines, fillers, cappers and direct printing machines) so that their operation may be jointly controlled and monitored.

Due to the availability of fast data transmission and mass storage for large amounts of data, it has proven advantageous to centrally monitor in a worldwide manner the operation of individual container treatment machines, especially entire container treatment systems. Cloud solutions are now being used for this purpose, which are able collect the data from the container treatment systems and then perform an evaluation of this data.

Based on this evaluation, the condition of the individual container treatment machines may be monitored, for example, and imminent faults may be detected or identified early during operation of the container treatment machines.

For this purpose, a large number of parameters, also called state variables, are usually monitored permanently and examined by corresponding computing units, such as servers in a cloud architecture, to determine whether anomalies are present in the totality of the state variables. If such anomalies occur or a certain constellation of state variables or state vectors occurs, a malfunction or imminent malfunction may then be concluded.

For the evaluation of such large amounts of data, especially for pattern recognition, neural networks are now also used in corresponding cloud solutions.

However, this approach also has disadvantages, as the machines require a permanent network connection to the outside world to ensure fault detection, which not only requires a stable Internet connection, but at the same time entails significant security risks in the transmission of this data. In addition, the evaluation of all data available for the container treatment machine provides a good overview of the entire operation of the machine. However, a large part of this data is not relevant for individual malfunctions, such as the failure of a single rotary encoder on a direct printing press. However, it does not make sense to sort out this data beforehand, as information about other faults would then be lost.

Object

Based on the known prior art, the technical object to be solved is thus to specify a method for monitoring the operation of a container treatment machine as well as a corresponding container treatment machine, which ensure reliable monitoring of operation and at the same time realize a high level of data security and, if possible, low component use and low costs during operation.

Solution

According to the invention, this object is solved by the container treatment machine or the method for monitoring the operation of the container treatment machine. The container treatment machine according to the invention for treating containers, such as, for example, bottles, cans or the like, in particular in the beverage processing industry, medical technology or the cosmetics industry, includes a control unit for controlling the operation of the container treatment machine and at least one treatment unit for treating the containers, wherein the container treatment machine is configured for treating the containers in exactly one way, wherein the container treatment machine includes at least one component configured to output data relating to its operating state and/or the operating state of the container treatment machine to the control unit, and wherein the control unit includes a neural network which is configured and trained to determine, on the basis of the data, whether a deviation of the operating state of the container treatment machine from a normal state is present and/or imminent.

The term "component" is to be understood here as any part of the container treatment machine that is able to detect/generate/record any data relevant to its operation or the operation of other parts of the container treatment machine and transmit the data to the control unit. Accordingly, these components may or may not necessarily be sensors.

The fact that the container treatment machine is configured to treat the containers in exactly one way is to be understood as meaning that the container treatment machine performs exactly one (i.e., not two or more, but only one) functional intervention on a container or is able to perform only one such intervention. This does not exclude that in or in the context of the container treatment machine additionally a transport of the containers takes place. A functional intervention on a container means changing at least one property of the container. This includes, for example, forming a preform into a container, filling the container, closing the container, providing the container with decorative elements, pretreating the outer and/or inner surface of the container, and inspecting the container. This also includes packaging of the container or a plurality of containers, such as assembling several containers into corresponding packs and forming a plastic wrapping for these containers. The cleaning of containers to be recycled or the crushing of plastic containers for the production of new containers from recycled plastic is also to be understood as corresponding functional interventions in the container and thus as individual treatments on the container.

With the container treatment machine according to the invention, monitoring of the operation of the container treatment machine becomes possible, wherein, analogous to the previous methods, further development of the monitoring based on the learning of the neural network is also ensured. At the same time, a permanently available data connection, for example via the Internet, to a server architecture set up remotely from the actual container treatment machine is no longer necessary. Moreover, the neural network is appropriately supplied with the data only that are relevant for the operation of the container treatment machine, so that the neural network and in particular the computing capacity of the control unit may be correspondingly reduced. This means, for example, that the storage capacity of the control unit may also be reduced. This also eliminates the need to sort out or even evaluate data that is relevant for other container treatment machines and has no influence on the operation of the actual container treatment machine.

It may be provided that the component includes at least one of a sensor, a rotary encoder, a camera, a container guide, a component of the control unit, a stationary part of the network architecture of the container treatment machine.

These embodiments of the component may be particularly advantageous to implement within the scope of the invention, as they output data useful for important characteristics of the operation of the container treatment machine. For example, the sensor may be a temperature sensor, pressure sensor, humidity sensor, speed sensor or the like.

Further, the control unit may be configured to output information to an operator when the neural network determines that there is and/or is about to be a deviation of the operating state of the container treatment machine from a normal state.

The information may be, for example, visual, acoustic or haptic information or a combination of these three or two different types of information. In particular, the information may be shown on a display or a warning signal (acoustic) may be emitted. Hereby, the operator may be effectively informed about imminent or already occurred problems during the operation of the container treatment machine, so that possible downtimes or the amount of rejects may be reduced.

In one embodiment, the neural network is configured to learn from an operation of the container treatment machine.

For example, the neural network may learn not only from the operation of the container treatment machine in the normal state, but also from the occurrence of faults and in particular the behavior of the data before the fault occurred, in order to improve fault detection. Thus, despite the limited data available, reliable fault detection and prediction of faults that may occur are realized.

In addition, the control unit may be configured to feed the neural network only with data during operation of the container treatment machine, which has been obtained from the component or components of the container treatment machine.

Hereby, the container treatment machine and in particular the control unit and the neural network running thereon may be operated essentially isolated, i.e., completely without data exchange with other devices, thereby in particular increasing the operational safety due to the impossibility of unauthorized access.

In a further embodiment, the container treatment machine is configured as one of an inspection machine, a direct printing machine, a labeling machine, a filler, a closer, a packer, a blow molding machine, a container cleaning machine, a mold filling machine, a pretreatment machine.

These container treatment machines may be monitored particularly advantageously with the monitoring system according to the invention.

The method according to the invention for monitoring the operation of a container treatment machine for treating containers, such as bottles, cans or the like, in particular in the beverage processing industry, medical technology or the cosmetics industry, wherein the container treatment machine includes a control unit controlling the function of the container treatment machine, and at least one treatment unit treating containers, the method providing that the container treatment machine treats containers in exactly one way, wherein the container treatment machine includes at least one component that outputs to the control unit data regarding its operating state and/or the operating state of the container treatment machine, and wherein the control unit includes a neural network, which is formed and trained to determine, on the basis of the data, whether a deviation of the operating state of the container treatment machine from a normal state is present and/or imminent.

This method allows reliable monitoring of the operating state of a container treatment machine, while at the same time ensuring the security of the data, but also the security of the operation due to the isolation of the control unit and the neural network from external access.

The neural network may be configured as a Deep Neural Network (DNN).

In this context, deep neural networks are those neural networks that have an (extensive) structure of intermediate layers. These neural networks are particularly suitable for recognizing patterns in large amounts of data and may therefore be used advantageously in the context of monitoring the operation of the container treatment machine.

There may also be a configuration, in which the neural network learns from the operation of the container treatment machine.

Learning from operation may lead to the advantage that the detection of faults for that specific container treatment machine may also be improved during operation of the container treatment machine.

Furthermore, there may be a configuration, in which the control unit only forwards data of the component or components of the container treatment machine to the neural network for learning during operation of the container treatment machine.

In particular, it is intended that data from all components of the container treatment machine that are made available to the control unit are also made available to the neural network. However, no data from other container treatment machines of the same type or other container treatment machines, such as a container treatment system, in which the container treatment machine is installed, are fed to the control unit and the neural network. The amount of data to be processed may thus be kept low, while still ensuring good fault detection.

It is also possible that the control unit transmits additional data to the neural network during maintenance of the container treatment machine and that the neural network learns from the additional data.

During such maintenance, for example, a suitable data carrier (USB stick, external hard disk or the like) may be used to transmit an amount of additional data (for example, several 100 MB of additional data) to the container treatment machine and, in particular, to the neural network for learning. This leads to the advantage that a more extensive learning of the neural network is possible without a permanent, possibly insecure, data connection.

In a further variant of this embodiment, the additional data includes data about an operating state of at least one further container treatment machine of a container treatment system, to which the container treatment machine belongs; and/or wherein the additional data includes data about an operating state of a container treatment machine of the same type.

The use of data from the same container treatment system may be advantageous as it may also indirectly or directly influence the operation of the container treatment machine. The use of data on the operating status of container treatment machines of the same type may serve to learn faults, only occurring after a large number of operating hours, already in the neural network, so that early detection of even these faults, such as faults only occurring statistically after 10 years of operation of a single container treatment machine, may be detected in time.

Further, the component may include at least one of a sensor, an encoder, a camera, a container guide, a component of the control unit, a component of the network architecture of the container treatment machine, and/or the component may transmit the data to the control unit in real time.

The data output by these components may advantageously serve for detections of impending or occurring faults.

It may also be provided that the control unit outputs information to an operator when the neural network determines that there is and/or is about to be a deviation of the operating state of the container treatment machine from a normal state.

This information may help the operator to detect in time any occurring faults and, for example, to stop the operation of the container treatment machine or to carry out a warning.

DETAILED DESCRIPTION

Figure 1:
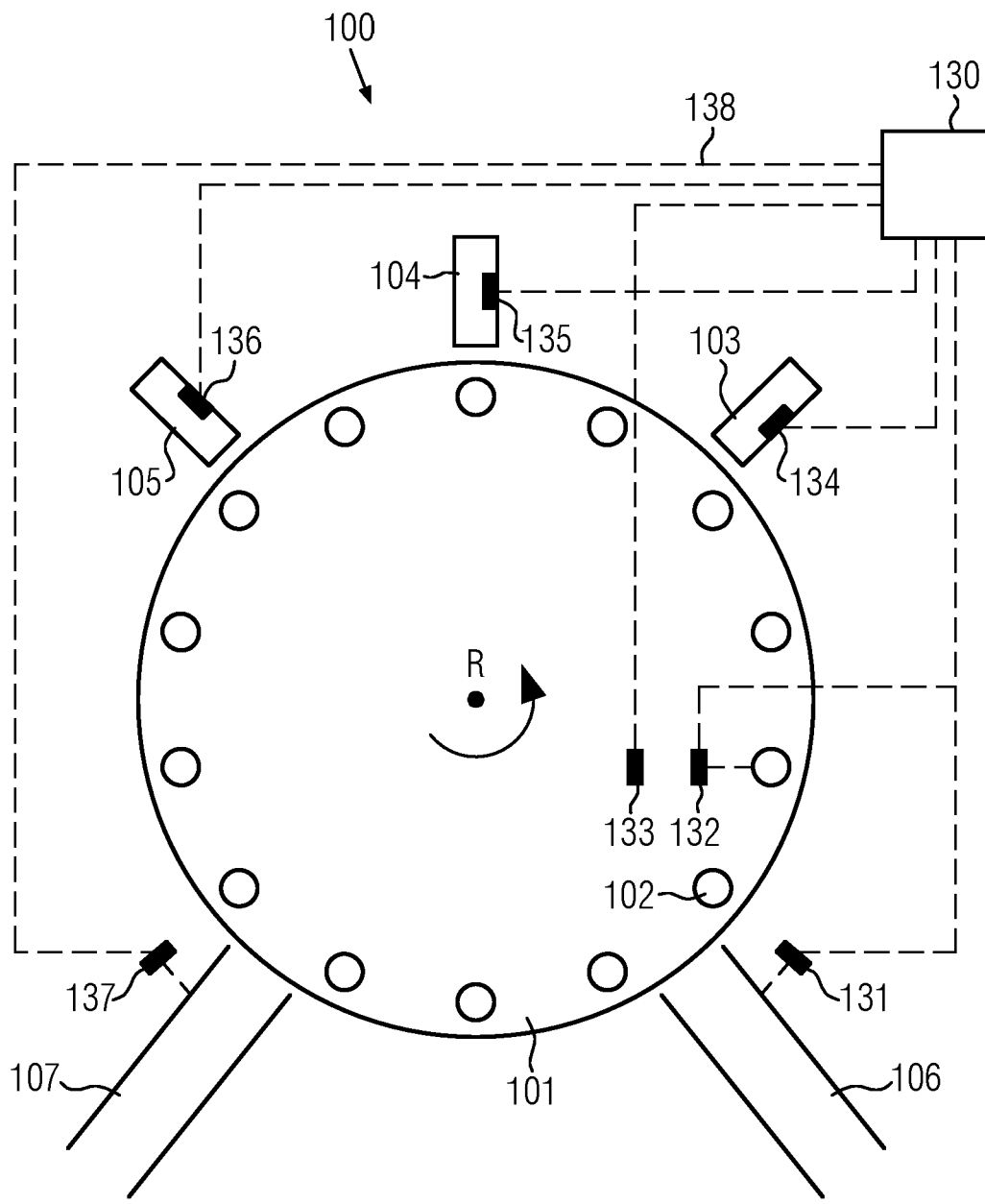
FIG. 1 is a schematic view of a container treatment machine according to one embodiment

FIG. 1 shows a container treatment machine 100 as may be used according to one embodiment of the invention. In FIG. 1, the container treatment machine is configured as a direct printing machine that may apply, at least partially, a printed image as a decorative element to containers. According to the invention, the container treatment machine or the container treatment machines are in particular container treatment machines, which are used in the beverage processing industry or in the cosmetics industry or in medical technology in order to treat containers in some way. In particular, these are machines configured to treat containers of dimensions common in the above-mentioned industries, such as bottles of 1 l, 2 l, 1.5 l, 0.5 l, 0.75 l or jars for creams with a volume of 100 ml, 150 ml, 200 ml or syringes or containers with a volume of 5 ml, 10 ml or 20 ml. Other types of containers used in the above industries as well as other sizes of containers are also intended to be encompassed herein, such as cans.

To this end, in the embodiment shown herein, the direct printing machine 100 includes a carousel 101 having a series of container receptacles 102, in which containers may be received for transport along the carousel (along the rotational direction R of the carousel as shown). The container receptacles 100 are devices known in principle from the prior art and may include, for example, standing plates or rotary plates and centering bells associated therewith, so that the container may be clamped between the plate on the one hand and the centering device on the other hand.

In the embodiment shown here, a series of printing modules 103, 104 and 105 is located at the periphery of the carousel 101 and is arranged and configured to apply printing ink to the surface of the container.

While three printing modules are shown here, more or fewer printing modules may be provided. Likewise, the arrangement on the periphery of the carousel is not limiting. Printing modules circulating with the individual container receptacles 102 are also conceivable, so that each container in its container receptacle may be printed by the modules associated with the container receptacle 102 during transport along the carousel 101.

Moreover, transport devices for the containers are shown schematically. The transport device 106 is configured as a feed device so that it is able to feed non-printed containers to the direct printing machine. The transport device 107 is configured as a transport device that is able to remove containers from the carousel 101 after printing and discharge them from the direct printing machine 100.

Furthermore, the container treatment machine 100 includes a control unit 130. According to the invention, this control unit is connected to individual components 131 to 137 of the container treatment machine, for example via a series of lines for data exchange 138. Wireless connections are also conceivable here.

In the embodiment shown in FIG. 1, for example, each container receptacle 102, each pressure module 103 to 105, as well as the carousel 101 and the transport devices 106 and 107 include components 131 to 137 assigned to them.

In the embodiment shown here, these components may be understood as "sensors" that may record data about the operating state of the component of the container treatment machine associated therewith (i.e., for example, component 135 from pressure module 104) and feed the data to control unit 130. However, the components 131 to 137 do not have to be configured as sensors. In principle, (movable) parts of the container treatment machine that are able to output data relating to an operating state either about themselves and/or the entire container treatment machine and/or other parts of the container treatment machine may be considered as components. For example, a servo motor may be considered as such a component. For example, the servo motor may be part of the container receptacle 102, but typically does not output information to the control unit 130 about the centering device of the container receptacle 102, but only about its own operating state, such as whether the operating voltage is correct or control signals are correctly received by the control unit.

In particular, temperature sensors, humidity sensors, pressure sensors, light sensors, speed sensors and the like may be considered as sensors, since all values measured by such sensors may usually be indicative or relevant for the operating state of a container treatment machine.

Cameras may also be considered as components, which are used, for example, as an inspection device when implementing the container treatment machine in order to check the containers.

In particular, the components are sensors, encoders, cameras, container guides or parts of the control unit (such as the network cables or the processor or the internal memory or the like) or, in general, a component of the network architecture (shown here schematically by the data connections 138) of the container treatment machine. In this regard, the network architecture may include all of the devices and components used for the purpose of data exchange (in particular, processors, memory, data links, and the like). These components may output information about their state to the control unit to enable control and monitoring of these components.

The embodiment of the container treatment machine 100 shown herein is to be understood as exemplary only, and the invention is not limited to applications in the field of direct printing machines.

On the contrary, analogous to what has been described so far, the container treatment machine may also be, for example, a blow molding machine, a labeling machine, an inspection machine, a filler, a closer, a packer, a blow molding machine, a container cleaning machine, a recycling machine for plastic containers, a mold filling machine or a pretreatment machine.

However, it is essential to the invention that any container treatment machine implemented according to embodiments of the invention treats containers in exactly one manner. The treatment of the containers includes a functional modification of the container or an inspection. A functional change may be represented, for example, by printing, labeling, closing, filling, shaping, crushing, recycling, cleaning, packaging or combining with other containers. According to the invention, the container treatment machine performs exactly one such functional treatment of a container.

In this sense, the transport of the containers, for example by the transport devices 106 and 107 or along the periphery of the carousel in the container receptacles 102, is not to be considered as a separate functional change of the container, but as part of such a change, since, for example for a direct printing machine, the functional treatment is to be seen in the fact that a printing image is applied to the container, but during this procedure the container is necessarily transported in some way.

Thus, the treatment of containers and thus the term "container treatment machine" does not include mere transport devices, but the treatment of the container in the sense of the invention may also include a transport, in addition to the functional modification of the container as described above.

According to the invention, the control unit 130 has or is associated with a neural network and the control unit feeds the data about the operating state of the component and/or the container treatment machine as received from the at least one component (for example, the component 134) to the neural network.

The neural network is preferably such a neural network that has been trained to determine, on the basis of data about the operating state of components and/or the entire container treatment machine, whether the machine is in normal operation or in a normal state or whether, for example, a malfunction has occurred (for example, a direct printing module has failed or the ink level is too low) or such a malfunction is (imminent). For this purpose, the neural network has preferably been trained in such a way that it draws conclusions as to whether the operation of the container treatment machine is running correctly, for example by comparing the data obtained from the components with already known patterns (of parameters) within the framework of pattern recognition, for which neural networks and here particularly preferably Deep Neural Networks (DNN) are specialized.

For example, the neural network may be trained to monitor a certain pattern of torque existing at a servo motor over an entire process cycle as the "normal state" of the turntable. In this sense, even minor changes may be considered by the neural network as data still characterizing normal operation. If, however, a change occurs that does not correspond to the normal state in the context of pattern recognition, the neural network may recognize this either as an indication of an imminent malfunction or as a malfunction that has occurred, and it may, thus, determine that there is no operating state of the container treatment machine within the normal state or that a deviation from the normal state is imminent.

Preferably, in the event that the operating state of the container treatment machine deviates from the normal state, the neural network and/or the control unit may be configured in such a way that information is output to an operator of the container treatment machine. This information may indicate to the operator, for example, that a malfunction is present or is about to occur. The information may be output to the operator, for example, on a display or suitable other display device of the control unit or on a display device assigned to the control unit. Other embodiments are also conceivable here. For example, corresponding information may be transmitted to the operator via a mobile terminal carried by him, such as a tablet computer, a smartphone or the like, and displayed on its display device. Acoustic and/or haptic information is also conceivable here. For example, in combination with or instead of visual information on a display device, an acoustic message in the sense of an acoustic alarm or beep or a haptic signal, such as a vibration of the mobile terminal (smartphone, tablet or similar) carried by the user, may also indicate to the operator that a malfunction is imminent or imminent.

The information provided to the operator may differ, in particular, depending on whether a deviation from the operating state is merely imminent or already present.

Figure 2:
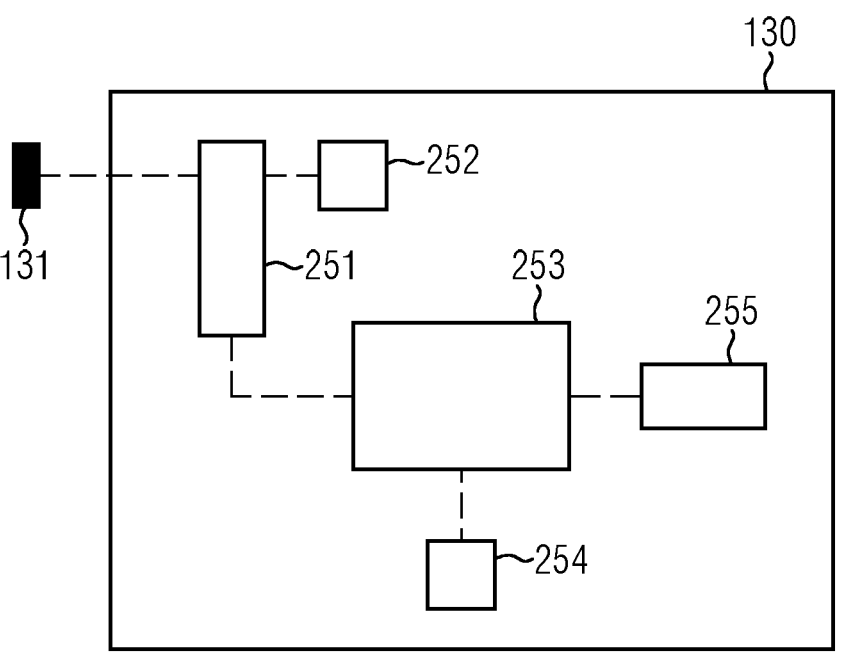
FIG. 2 is a schematic view of the process executed within the control unit

FIG. 2 shows an embodiment of the method according to the invention, in which the neural network evaluates the data transmitted to the control unit by the individual components (see also FIG. 1).

In the embodiment shown in FIG. 2, the control unit receives data only from components 131 that are associated with the container treatment machine, in which the control unit is implemented. This is only illustrative and not limiting. In one embodiment, the control unit may receive and evaluate (using the neural network) data from several or all of the components 131-137 already described with reference to FIG. 1.

The control unit may include a receiving unit 251 for receiving the data from the components 131. This receiving unit 251 may also be implemented as a pre-processing unit, which already performs an evaluation, manipulation, verification or, processing (of a part) of the data received from the individual components before this data is ultimately fed to the neural network 253. The receiving unit 251 may further be associated with a processing and/or storage unit 252, in which also a processing (of a part) of the data and/or a storing of the data may be performed.

The data is transmitted from the receiving unit 251 to the neural network 253, if necessary after appropriate pre-processing. The neural network has thereby preferably been implemented in the container treatment machine as a pre-learned neural network, wherein the learning of the neural network has preferably been carried out in such a way that it is trained to the operation of the container treatment machine whose control unit has implemented therein this neural network. This means that a neural network 253 implemented in a control unit 130 of a direct printing machine has been learned with different parameters than a normal network of a control unit of a blow molding machine has been learned. However, the basic architecture of the neural networks may be identical. In particular, they may have the same number of intermediate layers and/or nodes within the neural network.

The process of learning the neural network typically only changes the individual parameter values associated with the nodes and layers of the neural network, so that pattern recognition will produce different results for differently learned neural networks. However, the basic process of learning neural networks is sufficiently known from the prior art.

To evaluate data received from components 131, the neural network may access, for example, a memory 255 associated with it in order to retrieve the learned parameters. The neural network then uses the evaluation of the data to ultimately determine whether the data obtained is characteristic of a normal state of operation of the container treatment machine or a deviation or impending deviation from the normal state. The neural network may then transfer this information, for example, to the evaluation device 254 of the control unit 130, which evaluates the result of the neural network and, if necessary, outputs information to an operator, as has already been explained above.

It is particularly preferred if the neural network learns during operation of the container treatment machine, i.e. automatically performs a further refinement of the already pre-learned pattern recognition.

For this purpose, the neural network may be configured in such a way that it improves the parameters stored, for example, in the memory 255 during operation of the container treatment machine such that a detected normal operation and/or a detected malfunction and/or a detected imminent malfunction are incorporated in the parameters characteristic of the pattern recognition of the normal operation, and/or a corresponding pattern recognition of an imminent and/or already occurred malfunction, during operation.

Preferably, the neural network receives data during operation of the container treatment machine (it is irrelevant whether the operation is normal operation or malfunctioning operation) exclusively from components of the container treatment machine to which the control unit 130 having installed therein the neural network belongs. Preferably, therefore, at least during the time of operation of the container treatment machine, the neural network does not receive data from other container treatment machines, whether container treatment machines of the same container treatment system or container treatment machines distributed anywhere in the world but belonging, for example, to the same type of container treatment machine.

This does not mean that the control unit 130 would not receive such data (of other components) of other container treatment machines. However, in normal operation, it is intended that this data is then at least not forwarded to the neural network. This ensures that the neural network is not supplied with possibly compromised data via an insecure data line, which could ultimately lead to malfunctions.

However, in one embodiment, the neural network may be trained with additional data from other container treatment machines (either of the same type and/or of a different type).

Figure 3:
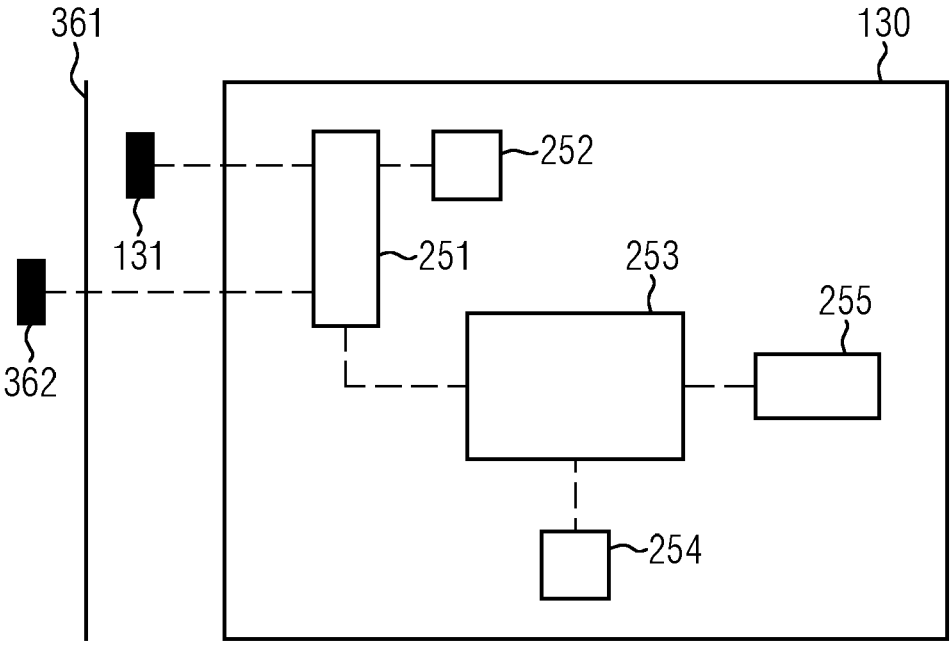
FIG. 3 is a schematic view of the process taking into account additional data.

To this end, FIG. 3 shows an embodiment, wherein the container treatment machine, with which the control unit 130 and the neural network 253 installed therein are associated, is not operated in normal mode, but for example in a maintenance mode. It is known that approximately annual maintenance cycles of container treatment machines are performed, during which operation is stopped and, for example, worn parts are replaced. The time sequence of such maintenance cycles is not limited according to the invention, however, and may in particular be periodic or also non-periodic (for example in the case of an unplanned repair).

During this standstill, it may then be considered that data is transferred to the control unit 130 via an external data carrier 362 or via a corresponding line for data exchange with other container treatment machines and thus from a component of such a container treatment machine. This data may be data about the operating state of a container treatment machine of the same container treatment system, in which the actual container treatment machine having implemented therein the control unit 130 is arranged. Alternatively, it may be data from a container treatment machine (of the same type) from another container treatment system, for example, located in another region of the world.

This data may either be in its structure recorded by the corresponding components, and/or pre-processing may have taken place. This pre-processing may also include processing of this data at a central location, such as in a server architecture outside the container treatment machine, and making a modification of neural network parameters immediately available, so that not original data from components, but "updates" of neural network parameters may be made available from outside the container treatment machine as part of the maintenance cycle.

In order to ensure data security as comprehensively as possible, it may be considered that this additional data is not made available via an Internet connection or other network connection, but via a data storage unit, which is to be connected to the container treatment machine and which has, for example, suitable security mechanisms to prevent unauthorized access or whose data has previously been checked by a (basically known) security program.

Alternatively, in the embodiment described in FIG. 3, a connection to an external data source may also be established via a secure Internet connection, in particular via a VPN connection, in order to prevent access by unauthorized third parties.

Although not described so far, it is particularly preferred if the components, such as those described in FIG. 1, provide the data to the control unit in real time or almost in real time, particularly preferably within short time intervals, so that the operation of the container treatment machine may be monitored as permanently as possible.

In this context, it depends to a significant extent on the component or the component of the container treatment machine monitored by the component, in which time intervals meaningful data relevant to the operating state of the component and/or the container treatment machine may be acquired and transmitted. Some components, such as rotary encoders or servo motors, make monitoring useful even in the range of a tenth or a few hundredths of a second. However, monitoring the fill level of an ink supply or monitoring a label supply of a labeling machine may make less time-resolved monitoring useful. For example, in the context of a label feed, monitoring on a time scale of the process cycle, for example a few tenths of a second between the application of a first label and the application of a second label to a subsequent container, may appear useful.

The invention is not limited as to the time intervals or sequence, with which data is acquired and transmitted to the control unit. Preferably, however, the data is transmitted to the control unit and correspondingly to the neural network almost without time delay, in particular in practically real time (taking into account the time delay due to the data transfer).

While the embodiments described so far are aimed in particular at the use of a neural network, since these may be used particularly advantageously in order to equip different container treatment machines with relatively little effort, other implementations may also be provided instead of the neural networks in order to detect deviations of the operating state of the container treatment machine or the treatment unit from normal operation. For example, other adaptive software algorithms may be used as an alternative or in addition to the neural networks, which are trained to the specific container treatment machine with regard to their (freely selectable) parameters. In this context, the term neural network is to be understood in principle in such a way that in the above embodiments other adaptive algorithms may also be used instead of the neural network. The invention is, as far as the specific learning or training of the neural network is not concerned, therefore not limited to the application of neural networks, but may also be realized with other adaptive algorithms according to the above embodiments.

The invention claimed is:

1. A container treatment machine for treating containers in the beverage processing industry, medical technology, or cosmetics industry, the container treatment machine, comprising:

a control unit for controlling operation of the container treatment machine and at least one treatment unit for treating the containers, the container treatment machine being configured to treat the containers in exactly one way;

wherein the container treatment machine comprises:

at least one component including a sensor, wherein the sensor collects and outputs data to the control unit relating to its operating state and/or the operating state of the container treatment machine;

wherein the control unit comprises:

a neural network configured and trained to determine, on the basis of the data, whether a deviation of the operating state of the container treatment machine from a normal state is present and/or imminent, wherein the neural network is specifically configured for the exactly one way of treating containers, wherein the neural network is trained on a pattern of a parameter of the at least one component over an entire process cycle as a normal state of the container treatment machine, wherein the neural network is configured in such a way that it improves parameters stored in a memory during operation of the container treatment machine such that a detected normal operation and/or a detected malfunction and/or a detected imminent malfunction are incorporated in the parameters characteristic of a pattern recognition of a normal operation, and/or a corresponding pattern recognition of an imminent and/or already occurred malfunction, during operation; and wherein the control unit is configured to output information to an operator when the neural network determines that a deviation of the operating state of the container treatment machine from the normal state is present and/or imminent, and wherein operation of the container treatment machine is stopped based on the deviation.

2. The container treatment machine according to claim 1, wherein the component further comprises at least one of an encoder, a camera, a container guide, a component of the control unit, a component of the network architecture of the container treatment machine, and a servo motor, and wherein the component is configured to transmit the data to the control unit in real time.

3. The container treatment machine according to claim 1, wherein the neural network is a pre-learned neural network.

4. The container treatment machine according to claim 1, wherein the control unit is configured to feed data to the neural network during operation of the container treatment machine only, with the data having been obtained from the component or components of the container treatment machine.

5. The container treatment machine according to claim 1, wherein the container treatment machine is configured as one of an inspection machine, a direct printing machine, a labeling machine, a filler, a closer, a packer, a blow molding machine, a container cleaning machine, a mold filling machine, a pretreatment machine.

6. The container treatment machine according to claim 1, wherein the information outputted to the operator differs depending on whether the deviation of the operating state of the container treatment machine from the normal state is imminent or already present.

7. The container treatment machine according to claim 1, wherein the information outputted to the operator is outputted to one of a display device of the control unit and a mobile terminal communicatively coupled to the control unit.

8. The container treatment machine according to claim 1, wherein the information outputted to the operator is outputted one or more of visually, acoustically, and haptically.

9. The container treatment machine according to claim 1, wherein the component is a servo motor and the parameter is a torque existing at the servo motor.

10. The container treatment machine according to claim 1, wherein prior to being transmitted to the control unit, the data of the at least one component is pre-processed, where pre-processing the data includes one of altering a structure of the data, implementing suitable security mechanisms, and making a modification of neural network parameters immediately available.

11. A method, comprising:

monitoring the operation of a container treatment machine for treating containers in the beverage processing industry, medical technology, or cosmetics industry, wherein the container treatment machine comprises:

a control unit controlling the operation of the container treatment machine and at least one treatment unit treating containers, wherein the container treatment machine treats containers in exactly one way, wherein the container treatment machine comprises at least one component including a sensor, wherein the sensor collects and outputs data to the control unit data-relating to its operating state and/or the operating state of the container treatment machine, wherein the control unit comprises a neural network configured and trained to determine, based on the data, whether a deviation of the operating state of the container treatment machine from a normal state is present and/or imminent, wherein the neural network is specifically configured for the exactly one way of treating containers, wherein the neural network is trained on a pattern of a parameter of the at least one component over an entire process cycle as a normal state of the container treatment machine, wherein the neural network is configured in such a way that it improves parameters stored in a memory during operation of the container treatment machine such that a detected normal operation and/or a detected malfunction and/or a detected imminent malfunction are incorporated in the parameters characteristic of a pattern recognition of a normal operation, and/or a corresponding pattern recognition of an imminent and/or already occurred malfunction, during operation, wherein the control unit outputs information to an operator when the neural network determines that a deviation of the operating state of the container treatment machine from the normal state is present and/or imminent, wherein the at least one component is configured to transmit data to the control unit in real time, and wherein operation of the container treatment machine is stopped based on the deviation.

12. The method according to claim 11, wherein the neural network is a deep neural network (DNN).

13. The method according to claim 11, wherein for learning during operation of the container treatment machine the control unit forwards to the neural network data from the component or components of the container treatment machine only.

14. The method according to claim 11, wherein the control unit transmits additional data to the neural network during maintenance of the container treatment machine and the neural network learns from the additional data.

15. The method according to claim 14, wherein the additional data comprises data about an operating state of at least one other container treatment machine of a container treatment system, to which the container treatment machine belongs; and/or wherein the additional data comprises data about an operating state of a container treatment machine of the same type.

16. The method according to claim 11, wherein the component comprises at least one of a sensor, an encoder, a camera, a container guide, a component of the control unit, a component of the network architecture of the container treatment machine, and a servo motor.

17. The method according to claim 11, wherein the control unit outputs information to an operator when the neural network determines that a deviation of the operating state of the container treatment machine from a normal state is present and/or imminent.

18. A container treatment machine for treating containers in the beverage processing industry, medical technology, or cosmetics industry, the container treatment machine comprising:

a control unit for controlling operation of the container treatment machine; and at least one treatment unit for treating the containers, the container treatment machine being configured to treat the containers in exactly one way, wherein the container treatment machine comprises at least one component that can including a sensor, wherein the sensor collects and outputs data to the control unit relating to its operating state and/or the operating state of the container treatment machine, wherein the control unit comprises a neural network configured and trained to determine, on the basis of the data, whether a deviation of the operating state of the container treatment machine from a normal state is present and/or imminent, wherein the neural network is specifically configured for the exactly one way of treating containers, wherein the control unit is configured to output information to an operator when the neural network determines that a deviation of the operating state of the container treatment machine from a normal state is present and/or imminent, wherein the neural network is configured to learn from an operation of the container treatment machine, wherein the neural network is configured in such a way that it improves parameters stored in a memory during operation of the container treatment machine such that a detected normal operation and/or a detected malfunction and/or a detected imminent malfunction are incorporated in the parameters characteristic of a pattern recognition of a normal operation, and/or a corresponding pattern recognition of an imminent and/or already occurred malfunction, during operation, wherein the control unit is configured to output information to an operator when the neural network determines that a deviation of the operating state of the container treatment machine from a normal state is present and/or imminent, wherein the component comprises at least one of a sensor, an encoder, a camera, a container guide, a component of the control unit, a servo motor, a component of the network architecture of the container treatment machine, wherein the component transmits the data in real time to the control unit, and wherein operation of the container treatment machine is stopped based on the deviation.

* * * * *